(No Model.) 2 Sheets—Sheet 1.
N. M. VALENTINE.
SHAFT OR TONGUE COUPLING.

No. 593,004. Patented Nov. 2, 1897.

Witnesses
Saml R Turner
C. C. Hines

Inventor
N. M. Valentine,
by R. S. & A. B. Lacey,
Attorneys.

THE NORRIS PETERS CO., PHOTO-LITHO., WASHINGTON, D. C.

(No Model.) 2 Sheets—Sheet 2.

N. M. VALENTINE.
SHAFT OR TONGUE COUPLING.

No. 593,004. Patented Nov. 2, 1897.

Witnesses
Sam R. Turner
C. C. Hines

Inventor
N. M. Valentine
By R. S. & A. B. Lacey
Attorneys

UNITED STATES PATENT OFFICE.

NATHAN M. VALENTINE, OF MONTEZUMA, IOWA.

SHAFT OR TONGUE COUPLING.

SPECIFICATION forming part of Letters Patent No. 593,004, dated November 2, 1897.

Application filed August 7, 1897. Serial No. 647,460. (No model.)

*To all whom it may concern:*

Be it known that I, NATHAN M. VALENTINE, a citizen of the United States, residing at Montezuma, in the county of Poweshiek and State of Iowa, have invented certain new and useful Improvements in Shaft or Tongue Couplings; and I do hereby declare the following to be a full, clear, and exact description of the invention, such as will enable others skilled in the art to which it appertains to make and use the same.

My invention relates to improvements in couplings for connecting the shafts or tongues of vehicles to the fore axles thereof; and it consists in the novel constructions, combinations, and arrangements of parts hereinafter more fully described, and particularly pointed out in the appended claims.

Figure 1:
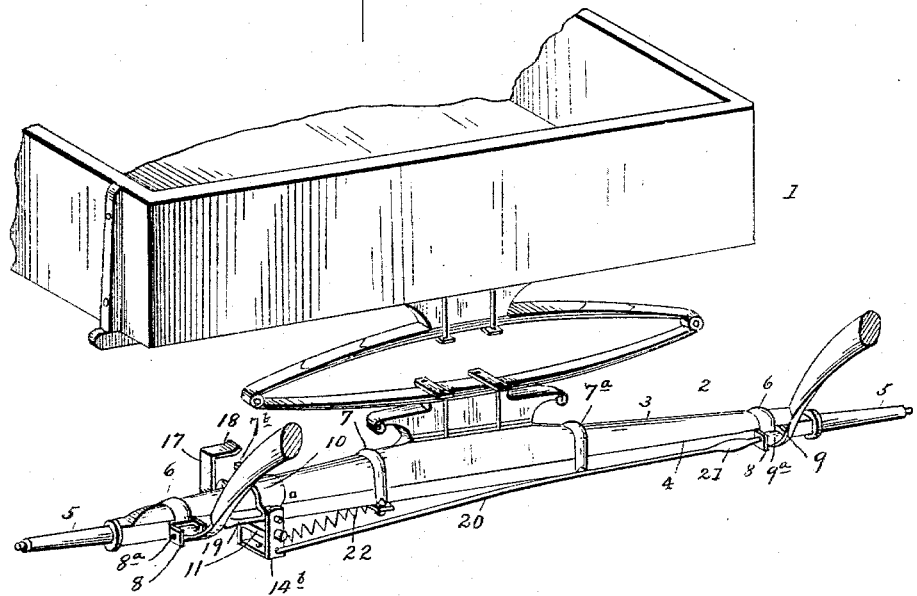
Figure 2:
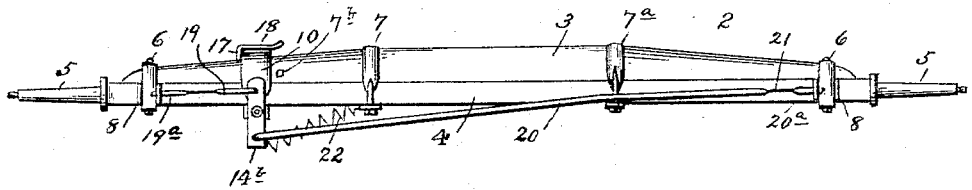
Figure 3:
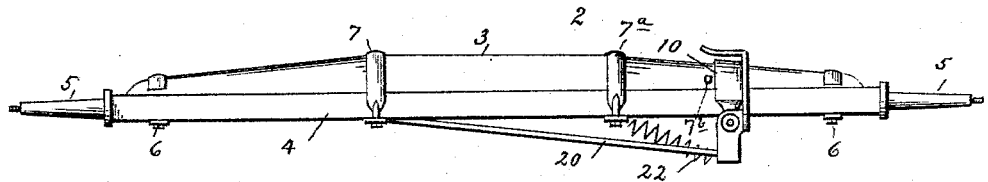
Figure 4:
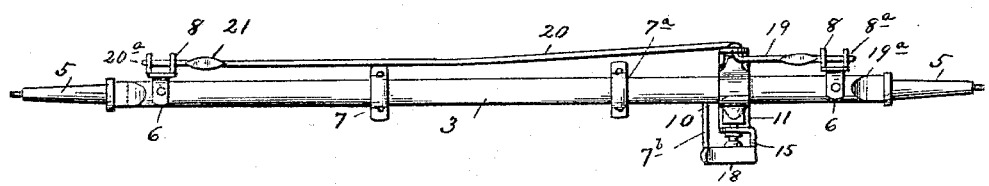
Figure 5:
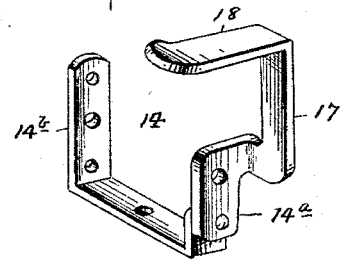
Figure 6:
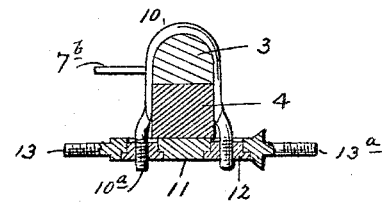

In the accompanying drawings, forming part of this specification, Figure 1 is a perspective view of a vehicle embodying my invention. Fig. 2 is an elevational view of the fore axle removed, showing my invention applied thereto; Fig. 3, a rear elevational view, and Fig. 4 a plan view, of the same; Fig. 5, a detail perspective view of the bolt-actuating device. Fig. 6 is a cross-section through the axle and bottom plate of clip 10.

Referring now more particularly to the accompanying drawings, 1 represents a vehicle of any approved construction, and 2 represents the fore axle thereof, comprising the wooden section 3 and the metallic section 4, provided with the spindles 5, on which the wheels are revolubly mounted. The two sections of the axle are connected, as usual, by the end clips 6 and intermediate clips 7 7$^a$.

The two end clips 6 are each provided, as usual, with the spaced parallel keeper-plates 8, having alined openings 8$^a$ and adapted to receive the apertured head 9$^a$ of the shaft-irons 9.

10 represents a clip secured to the axle adjacent one end thereof and contiguous to one of the end coupling-clips 6. The lower ends 10$^a$ of this clip are threaded and pass through threaded openings in a bottom pivot-plate 11, and are connected therewith by interiorly and exteriorly threaded bushings 12, which serve to clamp said clip to the axle. The opposite ends of the plate 11 are reduced to form spindles 13 13$^a$, on which pivots the bolt-actuating device, and the extremities of said spindles are threaded, as shown.

The bolt-actuating device consists of a substantially U-shaped lever 14, the parallel side arms 14$^a$ 14$^b$ of which are pivoted on said spindles, and are retained in position thereon by suitable nuts and washers engaging said spindles or by heading one spindle and providing a nut 15 on the other spindle, as shown. The arm 14$^a$ of the lever is formed with a lateral and vertical extension 17, having a horizontal foot-piece 18.

19 20 represent locking-bolts extending parallel with the axle, fulcrumed at one end to the arm 14$^b$ of the actuating-lever and having their opposite ends 19$^a$ 20$^a$ respectively passed through the openings 8$^a$ of the keeper-plates 8 and apertured head of the shaft-irons 9 and coupling said parts together. Each locking-bolt is preferably constructed of spring metal and is formed adjacent its outer end with a flattened portion 21 to permit said outer end to give or yield to prevent injury thereto during the locking operation when the apertures in the keeper-plates and shaft-irons are out of coincidence.

The foot-piece 18 of the bolt-actuating lever is disposed on the inner side of the shaft and adjacent one end thereof, and its position is such that it may be readily depressed by the foot of the operator either from the driver's seat of the vehicle or from the ground. This action retracts or draws the locking-bolts inward, so as to release the shaft-irons against the tension of the spiral spring 22, attached to the bottom plates of the clip 7 and actuating-lever 14, which spring serves to shoot or project the bolts and normally maintain them in such position.

A stop-bolt 7$^b$ extends through the wooden axle-section 3 and projects into the path of the foot-piece 18 and serves to limit the downward movement of the same.

By this construction and arrangement of the bolt-actuating mechanism it will be seen that the shafts or a tongue, with which latter it may also be employed, may be readily and quickly attached and detached for repair or for other purposes or to release a runaway horse from the vehicle.

The invention, while simple in construction, is effective in operation, not liable to get out of order, and is adapted for application to vehicles already built without altering the construction thereof.

I desire it understood that I do not limit my invention to the specific construction and arrangement of parts herein described, but reserve to myself the right to make such changes and modifications as fairly fall within the spirit and scope of my invention.

Having thus fully described my invention, what I claim as new and useful, and desire to secure by Letters Patent of the United States, is—

1. In shaft and tongue couplers for vehicles, the combination with the fore axle and tongue or shafts, a clip on said axle provided with a bottom clamping-plate formed with spindles, a substantially U-shaped lever having its side arms pivotally mounted on said spindles and provided with a depressible foot-piece, and bolts connected with said lever and adapted to couple the shafts or tongue and axle, substantially as described.

2. In shaft and tongue couplers for vehicles, the combination with the fore axle and tongue or shafts, a clip on said axle adjacent one end thereof provided with a bottom clamping-plate having its ends reduced to form spindles, a substantially U-shaped lever having its side arms pivotally mounted on said spindles and one of said arms provided with a foot-piece, bolts connecting with the opposite arm of said lever and adapted to engage and unite coupling members on the axle and shafts or tongue, and a spring normally holding said bolts projected, substantially as described.

In testimony whereof I affix my signature in presence of two witnesses.

NATHAN M. VALENTINE.

Witnesses:
J. W. CARR,
T. E. VEST.